United States Patent
Labrou et al.

(10) Patent No.: US 11,190,479 B2
(45) Date of Patent: Nov. 30, 2021

(54) DETECTION OF ABERRANT DOMAIN REGISTRATION AND RESOLUTION PATTERNS

(71) Applicant: VERISIGN, INC., Reston, VA (US)

(72) Inventors: Yannis Labrou, Washington, DC (US);
Tomofumi Okubo, Herdon, VA (US);
Eric Osterweil, Fairfax, VA (US);
Matthew Thomas, Atlanta, GA (US)

(73) Assignee: VERISIGN, INC., Reston, VA (US)

( * ) Notice: Subject to any disclaimer, the term of this patent is extended or adjusted under 35 U.S.C. 154(b) by 618 days.

(21) Appl. No.: 15/602,563

(22) Filed: May 23, 2017

(65) Prior Publication Data
US 2018/0343229 A1  Nov. 29, 2018

(51) Int. Cl.
*G06F 15/16* (2006.01)
*H04L 29/12* (2006.01)
*H04L 29/06* (2006.01)

(52) U.S. Cl.
CPC ...... *H04L 61/1511* (2013.01); *H04L 63/1425* (2013.01); *H04L 63/1458* (2013.01); *H04L 61/6018* (2013.01)

(58) Field of Classification Search
CPC ............ H04L 61/1511; H04L 61/6018; H04L 63/1425; H04L 63/1458
See application file for complete search history.

(56) References Cited

U.S. PATENT DOCUMENTS

| 2014/0165198 | A1 | 6/2014 | Altman | |
| 2015/0058977 | A1* | 2/2015 | Thompson | H04L 63/1416 726/22 |
| 2016/0110362 | A1 | 4/2016 | Khurana et al. | |
| 2016/0352767 | A1* | 12/2016 | Owhadi | G06F 16/2456 |
| 2016/0359701 | A1* | 12/2016 | Pang | G06F 3/0482 |
| 2017/0109395 | A1* | 4/2017 | Farah | G06F 16/2358 |
| 2018/0173110 | A1* | 6/2018 | Hu | G03F 7/705 |
| 2019/0124099 | A1* | 4/2019 | Matselyukh | H04L 41/142 |

OTHER PUBLICATIONS

Roolvink, Stephan, "Detecting Attacks Involving DNS Servers—A Netflow Data Based Approach"; Dec. 15, 2008 (Dec. 15, 2008). pp. i-75, XP055507291. Retrieved from the Internet: URL:http://www.utwente.nl/en/eemcs/dacs/assignments/completed/master/reports/2008-roolvink.pdf.
Extended European Search Report dated Sep. 21, 2018, EP Application No. 18 17 3829.5, pp. 1-8.

* cited by examiner

*Primary Examiner* — Ryan J Jakovac
(74) *Attorney, Agent, or Firm* — MH2 Technology Law Group, LLP

(57) ABSTRACT

A method for detecting a predetermined behavior during a domain name registration or a domain resolution activity includes identifying one or more dimensions to be tracked. One or more metrics for each dimension is/are identified. A first time series for each of the metrics is generated. One or more first outliers in at least one of the first time series is detected. One or more sets of metrics is generated, each set including a combination of two or more of the metrics. A second time series for each of the metrics in the one or more sets of metrics is generated. One or more second outliers in at least one of the second time series is/are detected.

20 Claims, 3 Drawing Sheets

DETECTION OF ABERRANT DOMAIN REGISTRATION AND RESOLUTION PATTERNS

BACKGROUND

A server, such as a Domain Name System (DNS) server, may receive a very large number of queries in a day. For example, a server may receive in excess of one million data queries in a day. The ability to detect anomalies or aberrant behavior within those queries may be useful in detecting miscreant or suspicious domain usage, registry promotions, channel bifurcation and/or consolidation, renewal forecasting, the general context/landscape of a registry, distributed denial of service (DDoS) attacks, and the like. As used herein, a registry promotion refers to an incentive, such as a pricing discount, for registrants to acquire services or products such as domain names. As used herein, channel bifurcation and/or consolidation refers to the merging or separation of sales channels in a distribution taxonomy. As used herein, renewal forecasting refers to a method for predicting if an asset, such as a domain name, will be renewed by the current registrant. As used herein, the general context/landscape of a registry refers to an entity that provides services around a database that facilitate the registration/deletion/maintenance of all domain names and associated registrant information for a top level domain in the DNS and provides access to third party entities to interact with the database.

However, due to the large number of queries, and the large number of dimensions of data within those queries, the analysis of the queries may take a technically prohibitive amount of time and computing resources, if they are processed using conventional systems and techniques. In addition, some (e.g., more subtle) anomalies in server queries may be difficult to detect using conventional analysis techniques. Accordingly, improved systems and methods for detecting anomalies or aberrant behavior within queries to a server would be desirable.

SUMMARY

A method for detecting a predetermined behavior during a domain name registration or a domain resolution activity is disclosed. The method includes identifying one or more dimensions to be tracked. One or more metrics for each dimension is/are identified. A first time series for each of the metrics is generated. One or more first outliers in at least one of the first time series is detected. One or more sets of metrics is generated, each set including a combination of two or more of the metrics. A second time series for each of the metrics in the one or more sets of metrics is generated. One or more second outliers in at least one of the second time series is/are detected.

A system is also disclosed. The system includes a processing system and a memory system. The processing system includes one or more processors. The memory system includes one or more computer-readable media. The one or more computer-readable media contain instructions that, when executed by the processing system, cause the processing system to perform operations. The operations include identifying one or more dimensions to be tracked. One or more metrics for each dimension is/are identified. A first time series for each of the metrics is generated. One or more first outliers in at least one of the first time series is detected. One or more sets of metrics is generated, each set including a combination of two or more of the metrics. A second time series for each of the metrics in the one or more sets of metrics is generated. One or more second outliers in at least one of the second time series is/are detected.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
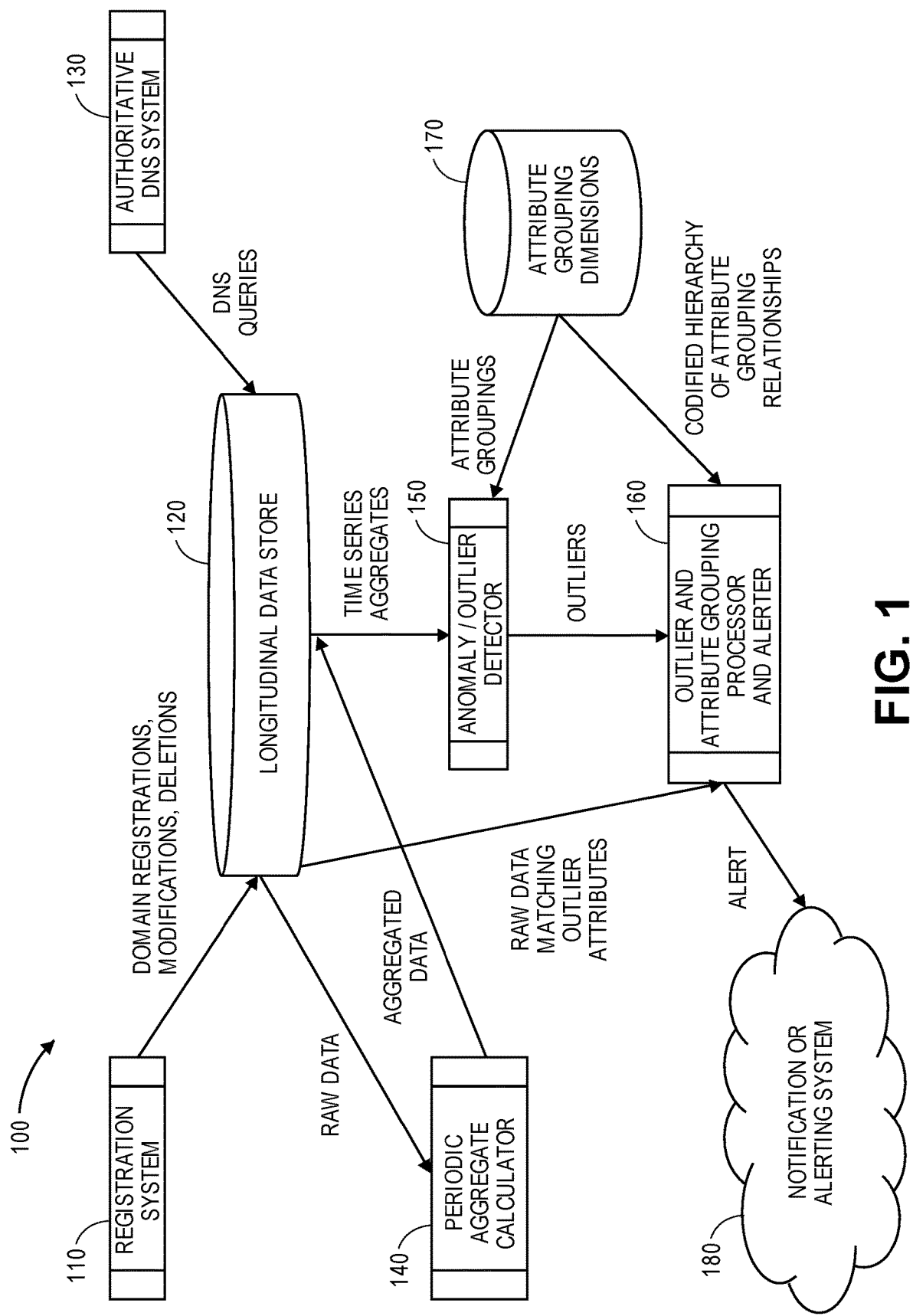
FIG. 1 is a diagram illustrating an example of a system for detecting a predetermined behavior during a domain name registration and/or domain resolution activity, consistent with certain disclosed embodiments.

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a diagram illustrating an example of a system 100 for detecting a predetermined behavior during a domain name registration and/or domain resolution activity, consistent with certain disclosed embodiments. As used herein, a domain resolution activity refers to the processes and interactions involving the communication between DNS clients and DNS servers during the resolution of names requested in a DNS query. The predetermined behavior may be or include anomalies and/or aberrant behavior that may signal an outlier or outlier event. As used herein, an anomaly and/or aberrant behavior refers to behavior that diverges from readily predictable patterns. As used herein, an "outlier" or "outlier event" refers to an event that is statistically significant based on prior observations. The system 100 may use a combination of clipping levels and time series outlier detection algorithms to identify potential outlier events. As used herein, a clipping level refers to a threshold level, determined a priori, that an event must exceed to meet an outlier event criteria. As used herein an outlier detection algorithm refers to a deterministic technique that can quantitatively state if a data point is statistically different from a previously observed population. The structure of the grouped dimensions for outliers may be used to coalesce outliers to the appropriate type of outlier event. The specific outlier groupings according to outlier event may be used to identify the candidate set of domains in question.

The system 100 may include a registration system 110, such as a DNS registration system. The registration system 110 may be configured to transmit domain registrations, modifications, and/or deletions to a longitudinal data store 120, which is a system, such as a database, that tracks the same type of information on the same subjects at multiple points in time. The system 100 may also include an authoritative domain name system ("DNS") 130. The authoritative domain name system 130 may transmit data from and/or representing DNS queries to the longitudinal data store 120.

The system 100 may also include a periodic aggregate calculator 140. The longitudinal data store 120 may transmit raw data (e.g., raw data related to DNS queries) to the periodic aggregate calculator 140, and the periodic aggregate calculator 140 may then transmit aggregated data back to the longitudinal data store 120. The raw data and/or the aggregated data may be or include at least portions of the domain registrations, modifications, and/or deletions, the DNS queries, or a combination thereof, which were originally received and/or processed by the authoritative domain name system 130.

The system 100 may also include an anomaly/outlier detector 150. The longitudinal data store 120 may transmit time series aggregates to the anomaly/outlier detector 150. The time series aggregates may be based at least partially upon the aggregated data. As used herein, a time series aggregate refers to the combination of multiple time series into a higher level "meta" time series (e.g., if a user summed all the character distributions for a specific length, the user would get the overall length count). The anomaly/outlier detector 150 may be applied upon the time series aggregates.

The system 100 may also include an outlier and attribute grouping processor and alerter 160. The anomaly/outlier detector 150 may detect outliers in the time series aggregates and transmit the outliers to the outlier and attribute grouping processor and alerter 160. The anomaly/outlier detector 150 may detect the outliers by comparing the current measurement against a historical corpus or time series of measurements and determining that the current measurement is X standard deviations (e.g., 2 or 3 standard deviations) above or below of the previous observations. The outlier and attribute grouping processor and alerter 160 may aggregate/combine outlier events in a manner that produces a concise and meaningful outlier event notification. This may be done by running the outliers through an a priori defined taxonomy.

The system 100 may also include an attribute grouping dimensions device 170. The attribute grouping dimensions device 170 may transmit attribute groupings to the anomaly/outlier detector 150 and may transmit a codified hierarchy of attribute grouping relationships to the outlier and attribute grouping processor and alerter 160. As used herein, attribute groupings refer to a taxonomy of measurement types defined a priori that structures various metrics/dimensions being measured. The attribute groupings may be user-defined and/or explicitly encoded into the attribute grouping dimensions device 170. The longitudinal data store 120 may also transmit raw data matching outlier attributes to the outlier and attribute grouping processor and alerter 160 in response to a specific measurement type/dimension requested by the outlier and attribute grouping processor and alerter 160.

The system 100 may also include a notification or alerting system 180. The outlier and attribute grouping processor and alerter 160 may transmit an alert to the notification or alerting system 180 when an outlier is detected. The notification or alerting system 180 may then notify a user (e.g., via email, Netcool, etc.).

Figure 2:
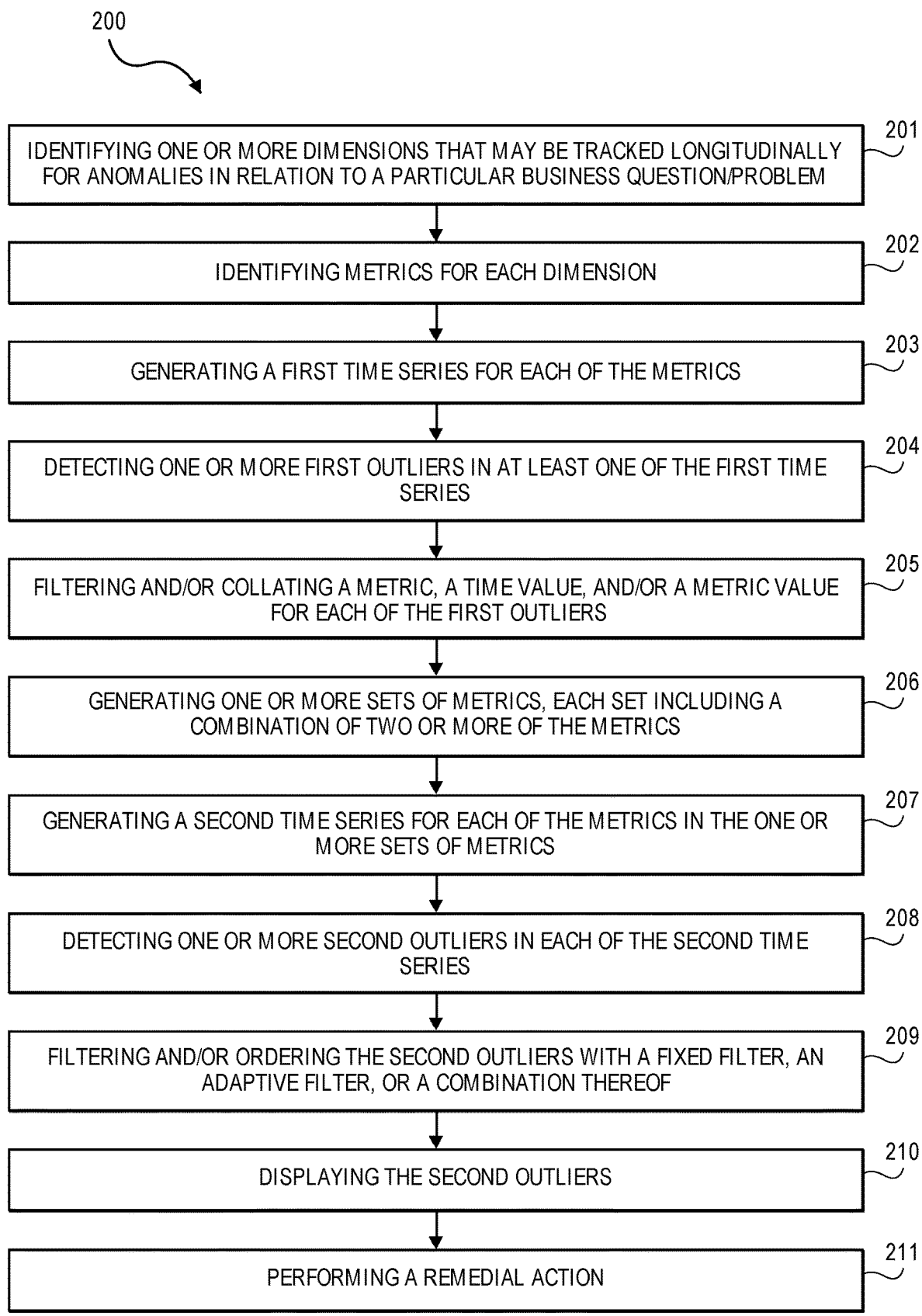
FIG. 2 is a flow diagram illustrating an example of a method for detecting a predetermined behavior during a domain name registration and/or domain resolution activity, consistent with certain disclosed embodiments.

FIG. 2 is a flow diagram illustrating an example of a method 200 for detecting a predetermined behavior during a domain name registration and/or domain resolution activity, consistent with certain disclosed embodiments. The method 200 may be used to address one or more technical (e.g., network) questions and/or problems. The technical questions/problems may be or include miscreant or suspicious domain usage (e.g., domain generation algorithms, spam, malware), registrar promotions (e.g., pricing discounts), channel bifurcation and/or consolidation (e.g., mergers, acquisitions, restructuring), domain name renewal forecasting, general context/landscape of a registry, DDoS detection and mitigation, patterns in domain name registration activity (e.g., additions or deletions of a top-level domain ("TLD")), Internet outages and/or censorship activity, or a combination thereof. As used herein, miscreant or suspicious domain usage refers to, for example, phishing domains, malware domains used in command and control infrastructures, spam domains, and the like. A domain name registry refers to a database of all domain names and the associated registrant information in the top level domains of the Domain Name System (DNS) of the Internet that allow third party entities to request administrative control of a domain name. It can provide authoritative DNS resolution services for the domains/TLD it operates.

The method 200 may include identifying one or more dimensions that may be tracked longitudinally for anomalies in relation to a particular technical question/problem, as at 201. As used herein, a dimension refers to an attribute pertaining to something of interest and that can be used to quantitatively describe the underlying subject. As used herein, tracking longitudinally refers to retaining measurements for various dimensions of a subject in some form of data to facilitate time series collection and analysis. The dimensions may be identified and/or tracked by programs written against registry services (e.g., either registration or DNS resolution) to "drink from the firehouse" and measure the various dimensions of interest for an underlying subject and insert/store those into the longitudinal data store. As will be appreciated, each technical question/problem may have a different subset of relevant dimensions. A non-exhaustive list of dimensions includes:

New registrations per registrar or registrar family
New registrations per registrant's country
New registrations per domain length
Average number of vowels for new registrations
Average number of consonants for new registrations
Deleted names per registrar or registrar family
Number of occurrences of a character in new registrations
Registration history (e.g., including, but not limited to, constraints on renewals, transfers, registrar, pricing data, registration data, and/or registration time) of a registrar
Traffic (e.g., including, but not limited to, constraints on DNS requests, DNS requests by type, distinct Qnames, distinct recursive IP addresses, specific Qname labels, actual traffic received, geographical source or other IP-oriented aggregation (e.g., ASN, /24 CIDR, BGP prefix) of such traffic, and/or the use of mechanisms to distinguish human from machine traffic)
WHOIS information (e.g., including, but not limited to, constraints on geographical properties, physical contact addresses, email addresses, and/or privatization status)
Content or topical markers (e.g., including, but not limited to, constraints on subject matter of domain or pages within, participation in domain parking or pay-per-click programs, and/or whether content exists)
Geographical markers (e.g., including, but not limited to, constraints on natural language of hosted content, WHOIS country of registration, generalizations drawn from choice of registrar or web-host, and/or IP geolocation outcomes)

Routing (e.g., including, but not limited to, constraints on whether the domain redirects to another domain and/or latency in reaching the domain)

Aftermarket pricing data (e.g., including, but not limited to, constraints on the prior sales of a domain in aftermarket marketplaces and the associated sales values)

TLD information (e.g., including, but not limited to, constraints on TLD, classification of TLD ad ccTLD or gTLD, TLD base size, age of TLD in marketplace, and/or TLD pricing information)

Security information (e.g., including, but not limited to, constraints on appearance of domain on blacklists or safe browsing lists)

Any other domain property not explicitly listed above

In an example (that continues throughout the steps of the method 200), the technical question/problem may be to identify anomalies or aberrant behavior in registrar activity for a group of TLDs operated by a registry operator. As will be appreciated, this example is focused on domain registrations, while resolution pattern detection would follow a similar process but with different dimensions. A non-exhaustive list of dimensions that are relevant to the particular technical question/problem in this example includes:

1a) New registrations per registrar
1b) New registrations per registrant's country
1c) New registrations per domain length
1d) Average number of vowels for new registrations
1e) Average number of consonants for new registrations
1f) Deleted names per registrar
1g) Number of occurrences of a character in new registrations The method 200 may also include identifying metrics for each dimension (e.g., 1a-1g), as at 202. As used herein, a metric generally refers to a quantitative measurement of a property of the underlying entity. A metric may be identified by a time series of values in a specific time granularity (e.g., minute, hour, day, week, month, quarter, year, etc.) where the value is (e.g., in the case of 1a), the number of new registrations per registrar, or the 7-day average of the number of new registrations per registrar, or the logarithm of the new registrations per registrar, or the percent difference of the current value (today) from its previous value (yesterday), or its value a quarter, or a week, or a year ago. A dimension such as 1a can be expressed in a variety of ways (i.e., metrics). In the example above, if there exist 20 registrars, dimension 1a may have 20 metrics: 2a-1 to 2a-20. Similarly, if there exist 200 countries in the world, dimension 1b may have 200 metrics: 2b-1 to 2b-200. If a length of a domain can vary from 1 to 64, dimension 1c may have 64 metrics: 2c-1 to 2c-64. Dimensions 1d and 1e each include a single metric: 2d-1 and 2e-1. Dimension if may have 20 metrics: 2f-1 to 2f-20. Dimension 1g may have 37 metrics: 2g-1 to 2g-37, assuming permissible characters in a domain are letters a-z and numbers 0-9 and "-". Thus, in this example, 343 metrics (e.g., 20+200+64+1+1+20+37) may be identified.

In another embodiment, the metrics may be defined as all possible combinations of instances across all dimensions. In this embodiment, this would result in 189,440,000 metrics as a possible starting point. Single dimension instances may be excluded, according to a fixed or adaptive threshold on the latest value. In other words, the 189,440,000 metrics difficult to process. The number may be reduced by eliminating potential combinations of the metrics either by hard-coded rules or algorithms. An example of applying a fixed threshold would be to ignore Registrar_3412 (introduced below) from the dimension "new registrations per registrar" if the current value for new registrations for Registrar_3412 is below a given threshold (e.g., 100). An example of applying an adaptive threshold would be one that makes reference to the time series' prior values and its derived statistics, (e.g., "filter if the current values is less than 150% of the median value over the past 25 days").

The method 200 may also include generating a first time series for each of the metrics, as at 203. This may include collecting, processing, and aggregating raw data to a desired time granularity, for each of the metrics, to generate the time series for each of the metrics. As used herein, a time series refers to a series of values of a quantity obtained at successive times (e.g., with equal intervals between measurements). The metrics can be generated from raw data of new registrations that have at least the following fields: Domain_name, Registrar, Time_of_registration, and Country_of_registrant. Given a desired time granularity (e.g., hourly, daily, weekly, monthly, or combination thereof), the raw data can be aggregated into a time series of the desired granularity.

Continuing with the example above, the data may be aggregated daily. Thus, 343 time series of values (e.g., one for each metric) may be generated on a daily basis. In at least one embodiment, the new daily values may be appended to each time series. The time series may be referred to as:

3a-1 to 3a-20
3b-1 to 3b-200
3c-1 to 3c-64
3d-1
3e-1
3f-1 to 3f-20
3g-1 to 3g-37

The method 200 may also include detecting one or more first outliers (also referred to as outlier events) in the time series, as at 204. Continuing with the example above, whenever is appropriate given the granularity of the time series (e.g., every day), an outlier detection algorithm may examine each of the 343 time series seeking to identify whether the latest value(s), or the most recent value(s), of the time series is/are anomalous or aberrant compared to the prior values of the time series. As used herein, the values may be anomalous or aberrant when the most recent metric is statistically different from the previously-observed metrics. Multiple outlier detection algorithms are known, and any of them may be used as the outlier detection algorithm. Illustrative outlier detection algorithms may be or include ARIMA, simple moving average, Holt-Winters, etc.

Outlier events may be identified for none, some, or all of the time series for the 343 metrics. A list of dimension, metric, time, and value may be the output of step 204. In the example, the output may be or include the following outlier events O-1 to O-14:

| Outlier Event | Measurement Type | Subject | Date | Value |
|---|---|---|---|---|
| O1 | New registrations per registrar | Registrar_2345 | Jan. 1, 2017 | 1278 |
| O2 | New registrations per registrar | Registrar_123 | Jan. 1, 2017 | 10295 |
| O3 | New registrations per registrar | Registrar_26 | Jan. 1, 2017 | 129 |

-continued

| Outlier Event | Measurement Type | Subject | Date | Value |
|---|---|---|---|---|
| O4 | New registrations per registrar | Registrar_263 | Jan. 1, 2017 | 19 |
| O5 | New registrations per registrar | Registrar_1234 | Jan. 2, 2017 | 20295 |
| O6 | New registrations per domain length | 5 | Jan. 1, 2017 | 15002 |
| O7 | New registrations per domain length | 5 | Jan. 2, 2017 | 6371 |
| O8 | New registrations per domain length | 7 | Jan. 2, 2017 | 3661 |
| O9 | New registrations per domain length | 6 | Jan. 2, 2017 | 6897 |
| O10 | Avg number of vowels per registration | | Jan. 1, 2017 | 3.678 |
| O11 | Number of occurrences of a character in new registrations | a | Jan. 1, 2017 | 1.5 |
| O12 | Number of occurrences of a character in new registrations | e | Jan. 1, 2017 | 1.3 |
| O13 | Number of occurrences of a character in new registrations | o | Jan. 1, 2017 | 1.1 |
| O14 | Number of occurrences of a character in new registrations | i | Jan. 1, 2017 | 1.4 |

In another embodiment, prior to detecting the outliers, the metrics may be filtered according to a fixed or adaptive threshold on the latest value. As used herein, the latest value refers to the most current or recent value in the time series. An example of applying a fixed threshold would be to ignore the metric "number of new registrations of length 5 from Registrar_3412" (introduced below) if the current value for "number of new registrations of length 5 from Registrar_3412" is below a given threshold (e.g., 10). An example of an adaptive threshold would be one that makes reference to the time series' prior values and its derived statistics (e.g., "filter if the current values is less than 150% of the median value over the past 25 days" for the metric "number of new registrations of length 5 from Registrar_3412").

In another embodiment, instead of or in addition to detecting the outliers, the operation 204 of the method 200 may include detecting level shifts. The term "level shift" refers to abrupt changes (e.g., steps, jumps, shifts) in the mean level of a time series, such as a plus or minus 20% change in the mean level. It may be considered as a special case of the statistical method known as change detection or change point detection.

The method 200 may also include filtering and/or collating a time value, and/or a metric value for each of the first outliers, as at 205. The outliers may optionally be filtered first, with a dimension-specific fixed or adaptive filter or a combination thereof. In one embodiment, the outlier for the dimension "new registrations per registrar" may be filtered out if the metric value is ≤100, meaning that of the new registrations for a registrar that are ≤100, the user may ignore the outlier event for further processing.

Collating the outliers may include grouping them by dimension and/or metric. Continuing with the example above, the output of the optional filtering may be collated as follows:

New registrations per registrar with 4 distinct values for registrar:
  Registrar_2345
  Registrar_123
  Registrar_26
  Registrar_1234

New registrations per domain length with 3 distinct values for domain length:
  5
  6
  7

Average number of vowels per registrations

Number of occurrences of a character in new registrations with 4 distinct values for the character:
  "a"
  "e"
  "o"
  "i"

The method 200 may also include generating one or more sets of metrics (e.g., 6-1 to 6-N), each set including a combination of two or more metrics from all of the possible combinations of metrics, as at 206. When generating the sets including a combination of two or more metrics, each metric may be from a different dimension. Continuing with the example above, the possible combinations of two or more metrics include 4*3+4*1+4*4+3*1+3*4+1*4=51. This includes, each of the "new registrations per registrar" (e.g., 4 metrics) with "new registrations per domain length (e.g., 3 metrics) PLUS each of the "new registrations per registrar" (e.g., 4 metrics) with "average number of vowels per registration (e.g., 1 metric) PLUS each of the "new registrations per registrar (e.g., 4 metrics) with "number of occurrences of a character in new registrations" (e.g., 4 metrics) PLUS each of the "new registrations per domain length" (e.g., 3 metrics) with "average number of vowels per registration (e.g., 1 metric) PLUS each of "new registrations per domain length" (e.g., 3 metrics) with "number of occurrences of a character in new registrations" (e.g., 4 metrics) PLUS "average number of vowels per registrations" (e.g., 1 metric) with each of "number of occurrences of a character in new registrations" (e.g., 4 metrics). Similarly, the number of three-metric combinations may include 4*3*1+4*1*4+3*1*4=40. The number of four-metric combinations may include 4*3*1*4=48. Thus, the total number of metric combinations is 51+40+48=139.

The first two of the metric combinations 6-1 to 6-139 may be a time series for:
  new registrations for registrar Registrar_2345 of length 5
  new registrations for registrar Registrar_2345 of length 6
  new registrations for registrar Registrar_2345 of length 7
  or another of the time series may be an average number of vowels for new registrations by Registrar_2345

The method 200 may also include generating a second time series for each of the metrics in the one or more sets of metrics (e.g., 6-1 to 6-N), as at 207. More particularly, this may include collecting, processing, and aggregating raw data to the desired time granularity (e.g., the same granularity as used in step 203) for each of the metrics (e.g., 6-1 to 6-N) to generate the second time series for each of the metrics. Optionally, prior to collection, processing, and aggregation of the raw data, the metrics 6-1 to 6-N may be filtered to a smaller subset of M metrics where M≤N based on a predetermined hierarchy of dimension significance. The hierarchy may be specific to the technical question/problem in step 201.

Given a significance hierarchy as follows (e.g., where rank (1) denotes more significant proceeding to rank (4) that is less significant, and two dimensions having the same number denotes that they are at the same level of the hierarchy:

1) New registrations per registrar
1) New registrations per registrant's country
1) Deleted names per registrar
2) Average number of vowels for new registrations
2) Average number of consonants for new registrations
3) New registrations per domain length
4) Number of occurrences of a character in new registrations The list 6-1 to 6-N may be filtered to only include metrics that include, for example:

The 2 most significant dimensions by rank (e.g., 1 and 2 in this case)
No more than 3 dimensions' instances regardless of rank
An arbitrary subset of dimensions (e.g., 1 and 4)
Or any combination thereof The goal of the optional filtering is to reduce the number of metrics to be explored for outlier detection and to focus on the subset of outliers that may be of higher interest for the technical question/problem. The ranking of dimensions provides a mathematical tool for prioritizing the dimensional combinations to be evaluated.

The method 200 may also include detecting one or more second outliers in each of the second time series (e.g., similar to step 204), as at 208. The following may be a second outlier in the output of step 208: new registrations with Registrar_123 for length 5 and length 6 and higher-than-normal occurrences of letters "a" and "i", Jan. 1, 2017, 5655. The goal of steps 205-208 is to reduce the overall space of metric combinations compared to the case of doing outlier detection on multi-dimensional time series at step 203. The theoretical maximum for the working example is larger than $20*200*64*1*1*20*37=189,440,000$, if all combinations of dimensions were to be explored for outliers. In other words, this would have been the minimum number of time series to evaluate for outlier detection if all of the combinations identified in step 202 were analyzed, and such a large number of evaluations would undesirably use excessive amounts of computing resources and bandwidth, and would take an undesirably amount of time to complete.

The method 200 may also include filtering and/or ordering the second outliers with a fixed filter, an adaptive filter, or a combination thereof, as at 209. For example, the second outliers may be filtered out if the metric value is ≤100, meaning that new registrations with Registrar_123 for length 5 and length 6 and higher-than-normal occurrences of letters "a" and "i", Jan. 1, 2017, 85 may be ignored for further processing. An adaptive filter makes reference to the second time series' prior values and its derived statistics, for example, "filter out if the outlier value is less than 150% of the median value over the past 25 days."

The method 200 may also include presenting/displaying the output of step 209, as at 210. The output of step 209 may be presented/displayed in the form of a dashboard automatically generated report or email, including any or all of the following: a list of outliers, one or more graphs of the time series associated with the outliers, highlighting the outliers, or a combination thereof.

The method may also include performing a remedial action in response to detecting, filtering, and/or displaying the second outliers, as at 211. The remedial action may be or include a Distributed Denial of Service (DDoS). For example, after detecting the second outliers for specific metrics (e.g., domain length and a specific recursive resolver IP), the remedial action may include applying a filter to limit/block traffic matching that pattern. Another example may be on domain registrations. If one or more registrations are observed with strange character distributions at a specific length from a specific registrar, those domains may warrant additional investigation from a security analytics team as potential miscreant domain candidates.

Figure 3:
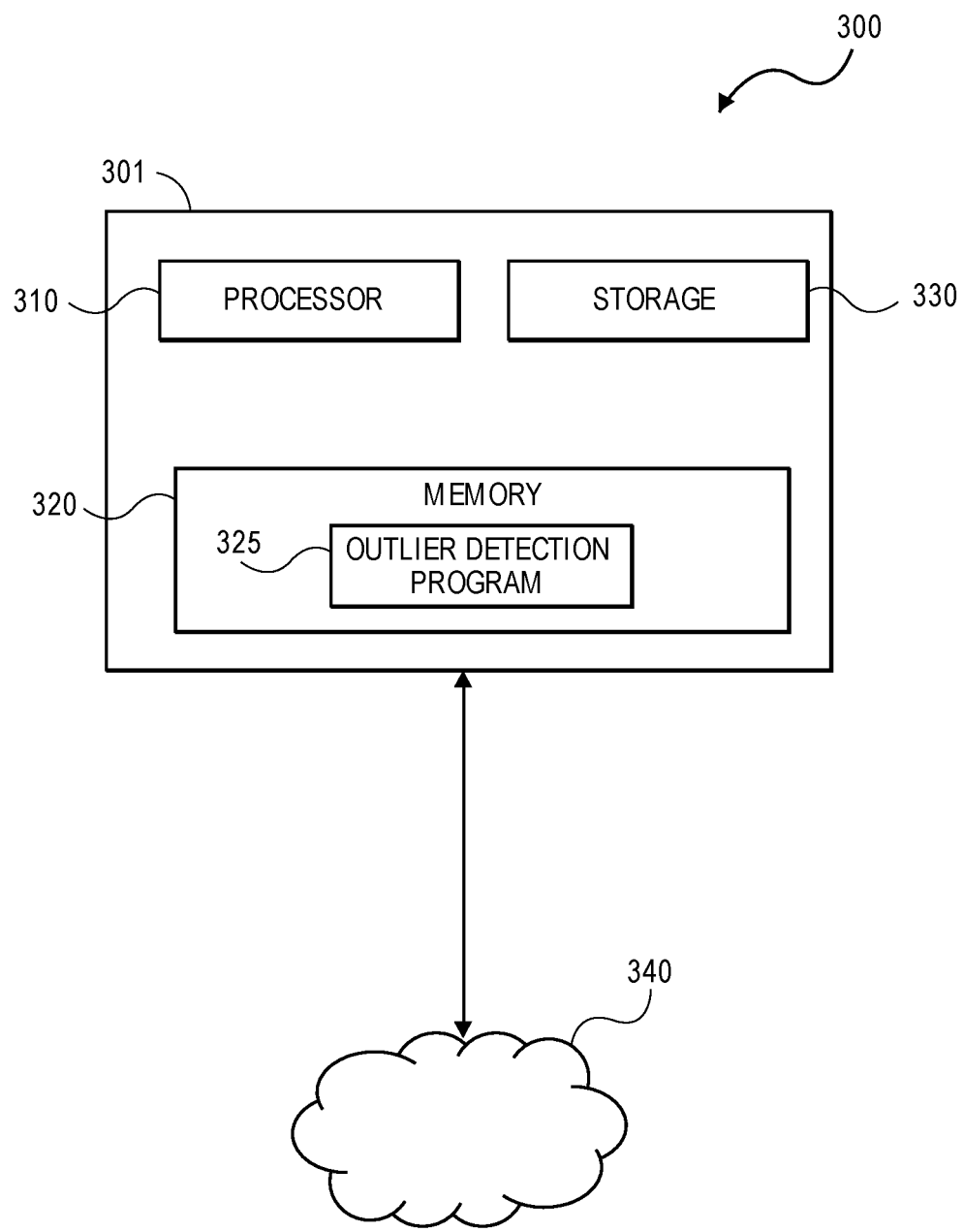
FIG. 3 is a diagram illustrating an example of a hardware system for performing at least a portion of one or more of the methods disclosed herein, consistent with certain disclosed embodiments.

FIG. 3 is a diagram illustrating an example of a hardware system 300 for performing at least a portion of one or more of the method 200 disclosed herein, consistent with certain disclosed embodiments. The example hardware system 300 includes example system components that may be used. The components and arrangement, however, may be varied.

The example hardware system 300 may include a computer 301. The computer 301 may include a processor 310, a memory 320, a storage 330, and input/output (I/O) devices (not pictured). The computer 301 may be implemented in various ways and can be configured to perform any of the embodiments described above. In some embodiments, the computer 301 can be a general purpose computer of an end user such as, for example, a desktop computer, a laptop, a tablet device, a mobile device (e.g., a smartphone), etc. In other embodiments, the computer 301 can be a computing device such as, for example, a data base server (e.g., a domain name registry), a web server, a mainframe computer, etc. The computer 301 may be standalone or may be part of a subsystem, which may, in turn, be part of a larger system. For example, the computer 301 can be at least a portion of the system 100 (e.g., the longitudinal data store 120, the periodic aggregate calculator 140, the anomaly/outlier detector 150, the outlier and attribute grouping processor and alerter 160, the attribute grouping dimensions device 170, and/or the notification or alerting device 180) shown and described in FIG. 1.

The processor 310 may include one or more known processing devices, such as a microprocessor from the Intel Core™ family manufactured by Intel™, the Phenom™ family manufactured by AMD™, or the like. The memory 320 may include one or more storage devices configured to store information and/or instructions used by the processor 310 to perform certain functions and operations related to the disclosed embodiments. The storage 330 may include a volatile or non-volatile, magnetic, semiconductor, tape, optical, removable, non-removable, or other type of computer-readable medium used as a storage device. In some embodiments, the storage 330 can include, for example, domain name records, DNS firewall customer IP addresses, and/or IP address blocks, etc.

In an embodiment, the memory 320 may include one or more programs or subprograms including instructions that may be loaded from the storage 330 or elsewhere that, when executed by the computer 301, perform various procedures, operations, or processes consistent with disclosed embodiments. For example, the memory 320 may include an outlier detection program 325 for performing at least a portion of the method 200. The memory 320 may also include other programs that perform other functions, operations, and processes, such as programs that provide communication support, Internet access, etc. The outlier detection program 325 may be embodied as a single program, or alternatively, may include multiple sub-programs that, when executed, operate together to perform the function of the outlier detection program 325 according to disclosed embodiments.

The computer 301 may communicate over a link with a network 340 to, for example, the registration system 110, the authoritative domain name system 130, the notification or alerting system 180, a user's computer, or a combination thereof. For example, the link may be a direct communication link, a local area network (LAN), a wide area network (WAN), or other suitable connection. The network 340 may include the internet, as well as other networks, which may be connected to various systems and devices.

The computer 301 may include one or more input/output (I/O) devices (not pictured) that allow data to be received and/or transmitted by the computer 301. The I/O devices may also include one or more digital and/or analog communication I/O devices that allow the computer 301 to communicate with other machines and devices. The I/O devices may also include input devices such as a keyboard or a mouse, and may include output devices such as a display or a printer. The computer 301 may receive data from external machines and devices and output data to external machines and devices via I/O devices. The configuration and number of input and/or output devices incorporated in I/O devices may vary as appropriate for various embodiments. Example uses of the hardware system 300 can be described by way of example with reference to the embodiments described above.

While the teachings has been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method for detecting a predetermined behavior during a domain name registration or a domain resolution activity, the method comprising:
   identifying a dimension to be tracked;
   identifying a plurality of metrics for the dimensions to be tracked;
   generating at least one first time series for the plurality of metrics;
   detecting a plurality of first outliers in at least one of the first time series;
   reducing a number of metrics used to detect an outlier by generating one or more sets of metrics from among at least one metric associated with the plurality of first outliers;
   generating a second time series for a metric in the one or more sets of metrics; and
   detecting one or more second outliers in the second time series, wherein the one or more second outliers comprise fewer outliers than the plurality of first outliers.

2. The method of claim 1, wherein generating the at least one first time series comprises collecting, processing, and aggregating raw data from domain name registrations to a predetermined time granularity for the metrics.

3. The method of claim 1, further comprising, prior to detecting the plurality of first outliers, filtering the plurality of metrics according to a fixed threshold or an adaptive threshold on a most recent value of the plurality of metrics.

4. The method of claim 1, wherein the dimension comprises a plurality of dimensions, the method further comprising grouping the plurality of first outliers by the dimensions of the plurality of dimensions, by the plurality of metrics, or by a combination thereof.

5. The method of claim 1,
   wherein the dimension comprises a plurality of dimensions,
   wherein, when generating the one or more sets of metrics, each of the metrics is from a different dimension of the plurality of dimensions.

6. The method of claim 1, further comprising, prior to generating the second time series, filtering the one or more metrics to a smaller subset of metrics based on a predetermined hierarchy of dimension significance.

7. The method of claim 1, further comprising filtering the one or more second outliers using a fixed filter.

8. The method of claim 1, further comprising filtering the one or more second outliers using an adaptive filter.

9. The method of claim 1, further comprising displaying the one or more second outliers.

10. The method of claim 1, further comprising mitigating a distributed denial of service (DDoS) in response to detecting the one or more second outliers.

11. A system comprising:
    a processing system comprising one or more processors; and
    a memory system comprising one or more computer-readable media, wherein the one or more computer-readable media contain instructions that, when executed by the processing system, cause the processing system to perform operations comprising:
    identifying a dimensions to be tracked;
    identifying a plurality of metrics for the dimension;
    generating at least one first time series for the plurality of metrics;
    detecting a plurality of first outliers in at least one of the first time series;
    reducing a number of metrics used to detect an outlier by generating one or more sets of metrics from among at least one metric associated with the plurality of first outliers;
    generating a second time series for a metric in the one or more sets of metrics; and
    detecting one or more second outliers in the second time series, wherein the one or more second outliers comprise fewer outliers than the plurality of first outliers.

12. The system of claim 11, wherein generating the at least one first time series comprises collecting, processing, and aggregating raw data from domain name registrations to a predetermined time granularity for the metrics.

13. The system of claim 11, wherein the operations further comprise, prior to detecting the plurality of first outliers, filtering the plurality of metrics according to a fixed threshold or an adaptive threshold on a most recent value of the plurality of metrics.

14. The system of claim 11, wherein the dimension comprises a plurality of dimensions, and wherein the operations further comprise grouping the plurality of first outliers by the dimensions of the plurality of dimensions, by the plurality of metrics, or by a combination thereof.

15. The system of claim 11, wherein the dimension comprises a plurality of dimensions, wherein, when generating the one or more sets of metrics, each of the metrics is from a different one of the plurality of dimensions.

16. The system of claim 11, wherein the operations further comprise, prior to generating the second time series, filtering the one or more metrics to a smaller subset of metrics based on a predetermined hierarchy of dimension significance.

17. The system of claim 11, wherein the operations further comprise filtering the one or more second outliers using a fixed filter.

18. The system of claim 11, wherein the operations further comprise filtering the one or more second outliers using an adaptive filter.

19. The system of claim 11, wherein the operations further comprise displaying the one or more second outliers.

20. The system of claim 11, wherein the operations further comprise mitigating a distributed denial of service (DDoS) in response to detecting the one or more second outliers.

* * * * *